United States Patent
Chintalapudi et al.

(10) Patent No.: US 9,310,462 B2
(45) Date of Patent: Apr. 12, 2016

(54) LOCATING A MOBILE COMPUTING DEVICE IN AN INDOOR ENVIRONMENT

(75) Inventors: Krishna Chintalapudi, Bangalore (IN);
Venkata N. Padmanabhan, Bangalore (IN); Anshul Rai, Bangalore (IN);
Rijurekha Sen, Mumbai (IN);
Gursharan Singh Sidhu, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 676 days.

(21) Appl. No.: 13/606,008

(22) Filed: Sep. 7, 2012

(65) Prior Publication Data
US 2014/0073345 A1 Mar. 13, 2014

(51) Int. Cl.
H04W 24/00 (2009.01)
G01S 5/02 (2010.01)
G01C 21/16 (2006.01)
G01C 21/20 (2006.01)
G01C 22/00 (2006.01)
H04W 4/02 (2009.01)

(52) U.S. Cl.
CPC ............. *G01S 5/0252* (2013.01); *G01C 21/165* (2013.01); *G01C 21/206* (2013.01); *G01C 22/006* (2013.01); *G01S 5/0263* (2013.01); *H04W 4/026* (2013.01); *H04W 4/027* (2013.01)

(58) Field of Classification Search
CPC ....... H04W 64/00; H04W 4/04; H04W 4/008;
H04W 4/027; H04W 4/028; H04W 4/02;
H04W 36/32; H04W 64/003; H04W 64/006;
H04W 8/16; H04W 4/026; H04W 24/00;
G01C 21/206; G01C 21/165; G01C 22/006;
G01S 5/0294; G01S 5/14; G01S 15/08;
G01S 5/0252; G01S 5/0263

USPC ............. 455/456.1, 456.2; 370/338; 709/236, 709/219; 340/539.3, 686.1
See application file for complete search history.

(56) References Cited

U.S. PATENT DOCUMENTS

| 6,323,807 | B1 * | 11/2001 | Golding ................. | G01C 21/20 342/419 |
| 6,522,266 | B1 * | 2/2003 | Soehren ............... | A61B 5/7264 340/988 |
| 2005/0285793 | A1 * | 12/2005 | Sugar et al. ................... | 342/465 |
| 2009/0177437 | A1 * | 7/2009 | Roumeliotis .......... | G01C 21/12 702/150 |

(Continued)

OTHER PUBLICATIONS

Zheng, et al., "HIPS: A Calibration-less Hybrid Indoor Positioning System Using Heterogeneous Sensors", Retrieved at <<http://ieeexplore.ieee.org/stamp/stamp.jsp?tp=&arnumber=4912832>>, PerCom 2009. IEEE International Conference on Pervasive Computing and Communications, Mar. 9, 2009, pp. 1-6.

(Continued)

*Primary Examiner* — Mahendra Patel
(74) *Attorney, Agent, or Firm* — Alin Corie; Sandy Swain; Micky Minhas

(57) ABSTRACT

Inferring location of a mobile computing device in an indoor environment and crowdsourcing radio frequency data are described herein. A location of the mobile computing device in the indoor environment is inferred based upon known physical constraints of the indoor environment and data from an inertial sensor of the mobile computing device, wherein an initial location in the indoor environment of the mobile computing device is unknown, a heading offset of the mobile computing device is arbitrary, and wherein a placement of the mobile computing device on a user is arbitrary.

20 Claims, 7 Drawing Sheets

(56) References Cited

U.S. PATENT DOCUMENTS

| | | | |
|---|---|---|---|
| 2010/0090899 A1 | | 4/2010 | Zhao et al. |
| 2012/0143495 A1* | | 6/2012 | Dantu .................... 701/428 |
| 2012/0203453 A1* | | 8/2012 | Lundquist et al. ......... 701/434 |
| 2013/0332064 A1* | | 12/2013 | Funk et al. .................. 701/409 |

OTHER PUBLICATIONS

Krumm, et al., "Minimizing Calibration Effort for an Indoor 802.11 Device Location Measurement System", Retrieved at <<http://research.microsoft.com/pubs/68919/tr-2003-82.pdf>>, Microsoft Research, Tech. Report. MSR-TR-2003-82, Nov. 13, 2003, pp. 1-9.

Rogoleva, Luba, "Crowdsourcing Location Information to Improve Indoor Localization", Retrieved at <<http://e-collection.library.ethz.ch/eserv/eth:1224/eth-1224-01.pdf>>, Swiss Federal Institute of Technology Zurich, Department of Computer Science, Institute for Pervasive Computing, Distributed Systems Group, Apr. 30, 2010, pp. 1-91.

Balas, Ciprian-Mihai, "Indoor Localization of Mobile Devices for a Wireless Monitoring System Based on Crowdsourcing", 2011, pp. 1-80.

Padmanabhan, Venkat, "The Quest for Zero-Effort Indoor Localization", Retrieved at <<http://www.pdl.cmu.edu/SDI/2012/043012.html>>, Retrieved date: Apr. 17, 2012, p. 1.

Alzantot, et al., "IPS: Ubiquitous Indoor Positioning System", Retrieved at <<http://wrc.ejust.edu.eg/IPS.html>>, Apr. 17, 2012, pp. 1-2.

Lee, et al., "Crowdsourced Radiomap for Room-Level Place Recognition in Urban Environment", Retrieved at <<http://ieeexplore.ieee.org/stamp/stamp.jsp?tp=&arnumber=5470515>>, 8th IEEE International Conference on Pervasive Computing and Communications Workshops (PERCOM Workshops), Mar. 29, 2010, pp. 648-653.

"Time Domain", Retrieved at <<http://www.timedomain.com>>, Retrieved Date: Apr. 17, 2012, pp. 1-2.

Bahl, et al., "RADAR: An In-building RF-based User Location and Tracking System •", Retrieved at <<http://edge.cs.drexel.edu/regli/Classes/CS680/Papers/Localization/radar-infocom00.pdf>>, IEEE INFOCOM 2000 Conference on Computer Communications, Nineteenth Annual Joint Conference of the IEEE Computer and Communications Societies, vol. 2, Mar. 2000, pp. 775-784.

Bauer, et al., "Using Wireless Physical Layer Information to Construct Implicit Identifiers -", Retrieved at <<http://petsymposium.org/2008/hotpets/mccoyd_hotpets2008.pdf>>, In Hot Topics in Privacy Enhancing Technologies, Jul. 2008, pp. 1-15.

Beauregard, et al., "Pedestrian Dead Reckoning: A Basis for Personal Positioning", Retrieved at <<http://130.75.2.171/fileadmin/WPNC06/Proceedings/33_Pedestrian_Dead_Reckoning.pdf>>, In 3rd Workshop on Positioning, Navigation and Communication, Mar. 16, 2006, pp. 27-36.

Brik, et al., "Wireless Device Indentification with Radiometric Signatures•", Retrieved at <<http://www.winlab.rutgers.edu/~gruteser/papers/brik_paradis.pdf, In 14th ACM international conference on Mobile computing and networking, Sep. 14, 2008, pp. 1-13.

Chintalapudi, et al., "Indoor Localization without the Pain", Retrieved at <<http://research.microsoft.com/pubs/135721/ez-mobicom.pdf>>, In the sixteenth annual International Conference on Mobile Computing and Networking, Sep. 20, 2010, pp. 173-184.

Fox, et al., "Monte Carlo Localization: Efficient Position Estimation for Mobile Robots •", Retrieved at <<http://citeseerx.ist.psu.edu/viewdoc/download?doi=10.1.1.2.342&rep=rep1&type=pdf>>, In Sixteenth National Conference on Artificial Intelligence, Jul. 1999, pp. 343-349.

Goswami, et al., "WiGEM: A Learning-Based Approach for Indoor Localization", Retrieved at <<http://conferences.sigcomm.org/conext/2011/papers/1569469851.pdf>>, In Seventh Conference on Emerging Networking Experiments and Technologies, Dec. 6, 2011, pp. 1-12.

Bulusu, et al., "GPS-Less Low Cost Outdoor Localization for Very Small Devices •", Retrieved at <<http://www.isi.edu/~johnh/PAPERS/Bulusu00a.pdf>>, In IEEE Personal Communications, vol. 7, Issue 5, Oct. 2000, pp. 28-34.

Kim, et al., "A step, Stride and Heading Determination for the Pedestrian Navigation System", Retrieved at <<http://www.gmat.unsw.edu.au/wang/gps/v3n12/v3n12p34.pdf, In Journal of Global Positioning Systems, vol. 3, Issue 1-2, Dec. 6, 2004, pp. 273-279.

Leonard, et al., "Simultaneous Map Building and Localization for an Autonomous Mobile Robot", Retrieved at <<http://cml.mit.edu/~jleonard/pubs/ldw_iros_1991.pdf>>, In International Workshop on Intelligent Robots and Systems, Nov. 3, 1991, pp. 1442-1447.

Robertson, et al., "Simultaneous Localization and Mapping for Pedestrians using only Foot-Mounted Inertial Sensors", Retrieved at <<http://citeseerx.ist.psu.edu/viewdoc/download?doi=10.1.1.180.5158&rep=rep1&type=pdf>>, In 11th international conference on Ubiquitous computing, Sep. 30, 2009, pp. 93-96.

Sen, et al., "SpinLoc: Spin Once to Know your Location.", Retrieved at <<http://www.cs.duke.edu/~ssen/Papers/spinloc_hotmobile12.pdf>>, In 13th Workshop on Mobile Computing Systems & Applications, Feb. 29, 2012, pp. 1-6.

Sen, et al., "Precise Indoor Localization using PHY Layer Information", Retrieved at <<http://conferences.sigcomm.org/hotnets/2011/papers/hotnetsX-final157.pdf>>, In 9th international conference on Mobile systems, applications, and services, Nov. 15, 2011, pp. 1-6.

Smith, et al., "On the Representation and Estimation of Spatial Uncertainty", Retrieved at <<http://www.frc.ri.cmu.edu/~hpm/project.archive/reference.file/Smith&Cheeseman.pdf>>, In International Journal of Robotics Research, vol. 5, No. 4, May, 1986, pp. 56-68.

Xiong, et al., "ArrayTrack: A Fine-Grained Indoor Location System", Retrieved at <<http://src.acm.org/2011/JieXiong.pdf>>, In 13th international workshop on Mobile computing system and applications, Feb. 28, 2012, pp. 1-6.

Youssef, et al., "The Horus WLAN Location Determination System", Retrieved at <<http://static.usenix.org/publications/library/proceedings/mobisys05/tech/full_papers/youssef/youssef.pdf>>, In 3rd international conference on Mobile systems, applications, and services, Jun. 6, 2005, pp. 205-218.

\* cited by examiner

LOCATING A MOBILE COMPUTING DEVICE IN AN INDOOR ENVIRONMENT

BACKGROUND

While radio frequency (RF) fingerprinting based upon Wi-Fi or cellular signals has been a popular approach to indoor localization in research literature, its adoption in the real world has been stymied by the need for site-specific calibration. Specifically, to perform localization based upon observed strengths of signals received from wireless transmitters in an indoor environment, a set of training data is necessary. Generally, the set of training data includes known static locations of wireless transmitters in the indoor environment, known locations of mobile computing devices in the indoor environment, and observed signal strength measurements for signals emitted by the wireless transmitters and observed at the wireless computing devices when the wireless computing devices are at respective known locations. An exemplary data packet that can be included in the set of training data for enabling RF fingerprinting in an indoor environment can include location coordinates of a mobile computing device in the indoor environment, a list of wireless transmitters in the indoor environment, and respective received signal strength (RSS) measurements generated at the mobile computing device at the location coordinates. Once a sufficient amount of training data has been acquired, a RF map (fingerprint) of the indoor environment can be generated.

A major deterrent in creating an RF map for an indoor environment is the requirement, in conventional approaches, of needing a relatively significant amount of user participation to collect the set of training data. Specifically, people must travel over an entirety of a floor space of an indoor environment, which may be relatively large (such as an airport or a shopping center), to collect RSS measurements from various locations in the indoor environment. In an exemplary approach, to obtain RSS measurements at known locations, a set of users is provided with a map of the indoor environment, which is presented on a display screen of a respective user's mobile computing device. As the user is moving in the indoor environment, such user manually indicates her position by selecting particular portions of the map. In this manner, RSS measurements can be mapped to locations of the indoor environment. It can be ascertained, however, that a significant amount of user effort is required to obtain such mapping of RSS measurements to locations, particularly on a relatively large scale.

SUMMARY

The following is a brief summary of subject matter that is described in greater detail herein. This summary is not intended to be limiting as to the scope of the claims.

Described herein are various technologies pertaining to inferring a location of a mobile computing device in an indoor environment based upon data output by inertial sensors in the mobile computing device and known physical boundaries of the indoor environment (e.g., known locations of walls, displays, . . . ). Exemplary inertial sensors in the mobile computing device include an accelerometer, a compass, and a gyroscope. With more particularity, data from at least one inertial sensor in a mobile computing device can be received, and a stride length of a user of the mobile computing device, a heading offset of the mobile computing device (an orientation of the mobile computing device relative to a direction of travel of the mobile computing device), and a location of the mobile computing device in the indoor environment can be jointly inferred. When performing such inference, location of the mobile computing device in the indoor environment can be inferred without knowledge of the initial location of the mobile computing device in the indoor environment, without assuming a particular heading offset of the mobile computing device, and without assuming a particular placement of the mobile computing device on a user.

The location of the mobile computing device can be inferred by combining data from inertial sensors of the mobile computing device with known physical constraints of the indoor environment (e.g., a user cannot walk through a wall or other barrier), thereby allowing infeasible locations to be filtered out over time. This results in convergence on a true location of the mobile computing device as a user of the mobile computing device transits along a travel path in the indoor environment. In an example, inertial sensors in a mobile computing device, such as an accelerometer and compass, may indicate that a user walked in a zig-zag path, taking a certain number of steps in a particular (unknown) direction, then turning 90° to the right, continuing to walk, and finally turning 90° to the left to take a few more paces prior to stopping. While this information does not, by itself, reveal a location of the mobile computing device in the indoor environment, such location can be inferred when analyzing the travel path together with known physical constraints of the indoor environment. For instance, a floor map may indicate that there is only one path on the floor that can accommodate the kind of zig-zag travel path ascertained through analysis of the sensor data. Accordingly, at the conclusion of the walk, the destination location of the mobile computing device can be inferred. Additionally, back propagation can be employed to trace the walk backwards, such that the entire travel path taken by the user can be inferred. Thus, a relatively high certainty of location of a user at a recent point in time can be leveraged to yield accurate estimates of location at previous points in time. Therefore, the location of the mobile computing device, and thus the user, in the indoor environment can be inferred over time without requiring any action on the part of the user.

In an exemplary embodiment, a set of training data that can be employed in connection with generating a RF map of an indoor environment can be collected through the approach described above, without requiring user effort; that is, the user can transit in the indoor environment without having to provide or validate location. Further, the set of training data can be generated/collected without requiring knowledge of an initial location in the indoor environment of users, orientation of mobile computing devices relative to directions of travel (walking) of users, and without assuming or requiring that users carry respective mobile computing devices in a particular manner.

Furthermore, in an example, a mobile computing device can be configured to perform RF scans, including Wi-Fi scans, cellular tower scans, Bluetooth scans, and the like to obtain identities of wireless transmitters and RSS measurements corresponding to beacon signals transmitted by such transmitters over time. These observed RSS measurements and wireless transmitter identities can be mapped to inferred locations of the mobile computing device in the indoor environment, thereby facilitating acquisition of a significant amount of training data without requiring user effort.

While the above has pertained to RF signals, it is to be understood that aspects described herein are not limited to RF signals. For example, mobile computing devices can be equipped with sensors that sense parameters unrelated to RF, such as a temperature or humidity distribution, and such data can be used to crowdsource location-based data (e.g., through temperature maps, humidity maps, . . . ). The location inference procedure can be used to enable crowdsourcing of other kinds of location-based data. For example, when mobile devices are equipped with temperature or humidity sensors, these can be used to crowdsource temperature or humidity maps.

Other aspects will be appreciated upon reading and understanding the attached figures and description.

DETAILED DESCRIPTION

Figure 1:
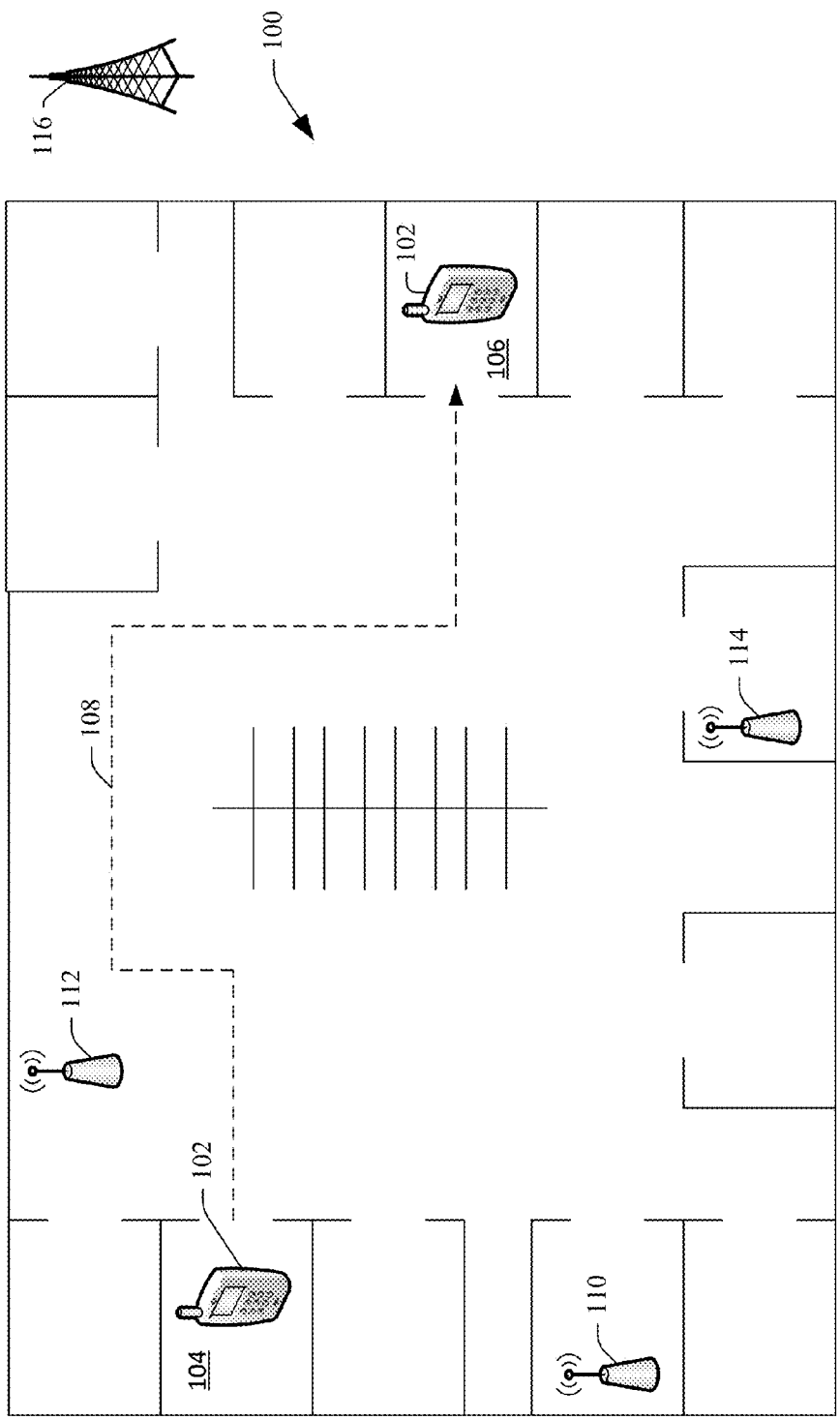
FIG. 1 illustrates an exemplary indoor environment in which aspects described herein can be practiced.

Various technologies pertaining to inferring location of a mobile computing device in an indoor environment, as well as crowdsourcing a set of training data to employ in connection with location-based fingerprinting, will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

With reference now to FIG. 1, an exemplary indoor environment 100 in which localization aspects described herein can be practiced is illustrated. In an exemplary embodiment, the indoor environment 100 can be an environment in which there is a relatively large amount of foot traffic, including, but not limited to, an airport terminal, a bus terminal, a train terminal, a subway terminal, a shopping center, a convention center, an arena, a domed stadium, a subway terminal, a museum, or any other suitable environment wherein conventional localization technologies, such as global positioning system (GPS) sensors, are either unreliable or are altogether inoperable. It is to be understood, however, that the indoor environment 100 can include environments that have somewhat less foot traffic, such as a house, an apartment, or the like. A mobile computing device 102 is located in the indoor environment 100, and transits from a first location 104 in the indoor environment 100 to a second location 106 in the indoor environment 100 over time by way of a travel path 108.

The mobile computing device 102 may be any suitable mobile computing device, including but not limited to a mobile telephone, a tablet computing device, a mobile gaming device, a mobile media player, a laptop computing device, or the like. The mobile computing device 102 comprises a plurality of inertial sensors, which are configured to output data related to motion of the mobile computing device 102 and/or direction of travel of the mobile computing device 102 in the indoor environment 100. The plurality of inertial sensors, for instance, can comprise an accelerometer, a compass, a gyroscope, etc. It is to be understood, however, that the plurality of inertial sensors does not comprise a sensor that outputs absolute location of the mobile computing device 102, such as a GPS sensor.

Is further to be understood that the first location 104 of the mobile computing device 102 is unknown. Additionally, a placement of the mobile computing device 102 with respect to a user thereof is unknown and unassumed. Accordingly, the user of the mobile computing device 102 may be holding the mobile computing device 102 in her hand, may have the mobile computing device 102 placed in a pant pocket, may have the mobile computing device 102 placed in a shirt pocket, may have the mobile computing device 102 in a bag, etc. Still further, a heading offset of the mobile computing device 102 can be unknown and unassumed, wherein the heading offset is an orientation of the mobile computing device 102 relative to a direction of travel of a user of the mobile computing device 102. For instance, the user of the mobile computing device 102 may, when employing the mobile computing device 102 in certain applications, orient the mobile computing device 102 approximately orthogonal to a direction of travel of the user (e.g., such as when watching a video or transmitting a text message while holding the device in landscape mode).

In an exemplary embodiment, the mobile computing device 102 can have an application executing thereon that facilitates identifying a location of the mobile computing device 102 in the indoor environment 100 as the mobile computing device 102 transits along the travel path 108, wherein the location of the mobile computing device 102 is inferred based at least in part upon data output by the plurality of inertial sensors and known physical constraints (e.g., locations of walls, barriers, . . . ) of the indoor environment 100. By jointly considering the data output by the inertial sensors of the mobile computing device 102 and the known constraints of the indoor environment 100 (e.g. that a user of the mobile computing device 102 is unable to walk through a wall or other barrier in the indoor environment 100), a location of the mobile computing device 102 as it travels along the travel path 108 can be inferred. For instance, when the mobile computing device 102 is at the first location 104, such location 104 can be unknown, as no data that is indicative of the travel path 108 of the mobile computing device 102 has been generated by the plurality of inertial sensors.

Such sensors, however, when monitored over time, can output data that indicates that the mobile computing device 102 has traveled some initial distance without making a turn. Based upon such distance and the known physical constraints of the indoor environment, infeasible locations of the mobile computing device 102 in the indoor environment 100 can be filtered out. As shown in the travel path 108, the user of the mobile computing device 102 can turn to the left and travel a relatively small distance. Again, as the mobile computing device 102 transits along the travel path 108, infeasible locations of the mobile computing device 102 can be filtered out. Subsequently, the data output by the plurality of inertial sensors can indicate that the user of the mobile computing device 102 has turned to the right, and that the user of the mobile computing device 102 has traveled some distance along the travel path 108. Thereafter, data output by the plurality of inertial sensors can indicate that the user of the mobile computing device 102 has turned to the right and thereafter has turned to the left. At this point, for example, as the travel path 108 in the indoor environment 100 is the only possible travel path given the physical constraints of the indoor environment 100, the second location 106 of the mobile computing device 102 can be inferred. Moreover, since an entirety of the travel path 108 of the mobile computing device 102 can be inferred, back propagation techniques can be employed to identify the location of the mobile computing device 102 with respect to time along an entirety of the travel path 108. Thus, the first location 104 of the mobile computing device 102, which was initially unknown, can also be inferred.

While the mobile computing device 102 has been described as including an application that facilitates identifying the location of the mobile computing device 102 in the indoor environment 100, it is to be understood that another computing device that is in communication with the mobile computing device 102 can be configured to identify the location of the mobile computing device 102 in the indoor environment 100. In such an embodiment, the mobile computing device 102 can be configured to transmit data generated by the plurality of inertial sensors to another computing device by way of a suitable network connection.

The indoor environment 100 can further comprise a plurality of access points 110, 112, and 114 that can be configured to transmit radio frequency (RF) signals, such as beacon signals, that can be received by the mobile computing device 102. In an exemplary embodiment, the access points 110-114 may be or include Wi-Fi access points, Wi-Max access points, Bluetooth access points, or any other suitable RF access points. Additionally, at least one cellular tower 116 may be relatively proximate to the indoor environment 100 (e.g., within 10 km of the indoor environment 100), such that the mobile computing device 102 can receive beacon signals transmitted by the cellular tower 116.

As the mobile computing device 102 transits along the travel path 108 in the indoor environment 100, the mobile computing device 102 can be configured to generate received signal strength (RSS) measurements for beacon signals transmitted by the wireless access points 110-114 and the cellular tower 116. Additionally, the mobile computing device 102 can be configured to retain identities of the wireless access points 110-114 and identity of the cellular tower 116 corresponding to the RSS measurements, as well as assign respective timestamps to the RSS measurements. Since the location of the mobile computing device 102 along the travel path 108 in the indoor environment 100 can be inferred with respect to time, RSS measurements for beacon signals transmitted by the wireless access points 110-114 and the cellular tower 116 can be assigned to locations along the travel path 108 in the indoor environment 100.

It can be understood that RSS measurements for inferred locations can be collected from numerous mobile computing devices that transit through the indoor environment 100. Accordingly, an RF map of the indoor environment can be generated by way of crowdsourcing, wherein users need not provide any explicit input to generate mappings between locations and RSS measurements.

It is to be understood that consent of users of mobile computing devices that provide mappings between locations and RSS values can be received prior to obtaining such mappings. Additionally, mappings between locations and RSS measurements can be anonymized, such that the training data set collected by way of crowdsourcing lacks identification information.

Subsequent to collection of a sufficient amount of training data, an RF map of the indoor environment 100 can be generated. A mobile computing device traveling in the indoor environment 100 can generate one or more RSS measurements for beacon signal(s) transmitted by a subset of the access points 110-114 and/or cellular towers, and location of such mobile computing device in the indoor environment 100 can be relatively accurately determined using convention RF fingerprinting techniques.

Figure 2:
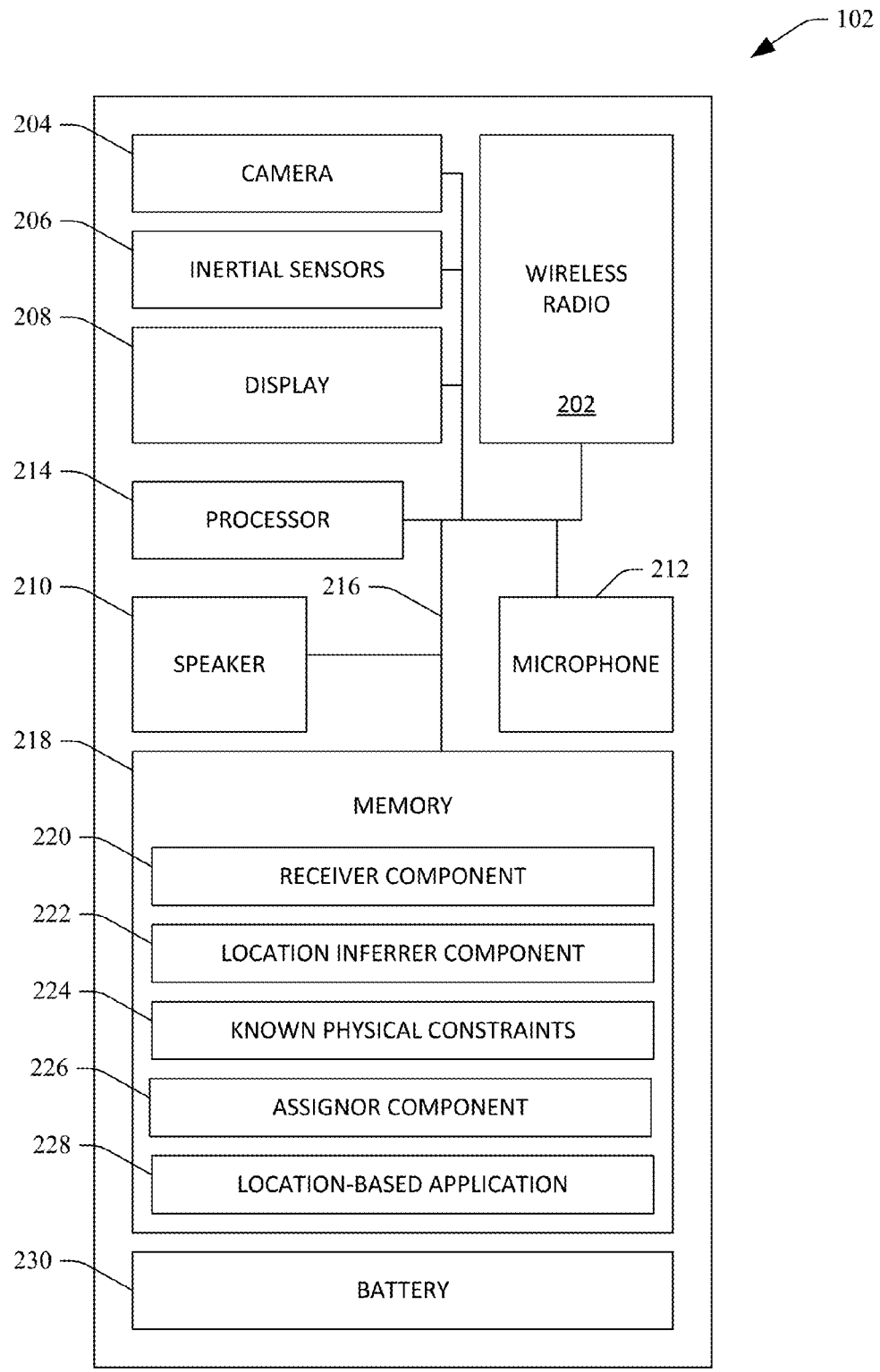
FIG. 2 is a functional block diagram of an exemplary mobile computing device.

Now referring to FIG. 2, a functional block diagram of the mobile computing device 102 is illustrated. The mobile computing device 102 comprises a wireless radio 202 that can be employed to receive/transmit wireless signals from/to one or more access points. Accordingly, the wireless radio 202 can comprise an antenna and associated hardware to facilitate wireless transmittal and receipt of data.

The mobile computing device 102 may additionally comprise a camera 204, which can be configured to capture images and/or video of a region proximate to the mobile computing device 102. The mobile computing device 102 further comprises a plurality of inertial sensors 206, which as mentioned above, can comprise a compass and accelerometer. While not shown, the mobile computing device 102 can also comprise other sensors, such as temperature sensors, humidity sensors, and the like.

A display 208 is configured to display graphical data to a user of the mobile computing device 102. In an exemplary embodiment, the display 208 may be a touch-sensitive display, including a multi-touch display. The mobile computing device 102 also comprises a speaker 210 that outputs audible signals. A microphone 212 receives audible signals, such as spoken utterances of a user of the mobile computing device 102.

The mobile computing device 102 further comprises a processor 214 that can transmit signals to/from the wireless radio 202, the camera 204, the inertial sensors 206, the display 208, and/or the speaker 210 by way of a bus 216. Such signals can be based upon signals received from the wireless radio 202, the camera 204, the inertial sensors 206, the display 208, and/or the microphone 212.

The mobile computing device 102 also comprises a memory 218 that comprises a plurality of components that can be executed by the processor 214. The plurality of components in the memory 218 comprise a receiver component 220 that receives data generate generated by at least one inertial sensor from the inertial sensors 206. Pursuant to an example, data received by the receiver component 220 from the at least one inertial sensor can comprise a first data generated by the at least one inertial sensor when the mobile computing device 102 is at an initial unknown location in the indoor environment 100. As alluded to above, the initial unknown location can be an arbitrary location in the indoor environment 100. Furthermore, the initial unknown location can be indeterminable based solely upon the first data received from the at least one inertial sensor. For example, location of the mobile computing device 200 in the indoor environment 100 is indeterminable based solely upon a single compass reading.

The receiver component 220, over time, also receives second data generated by the at least one inertial sensor, wherein the second data is generated by the at least one inertial sensor subsequent to the mobile computing device 200 being at the initial, unknown location in the indoor environment 100. The second data is generated by the at least one inertial sensor during transit of the mobile computing device 102 from the initial unknown location along the travel path 108.

The plurality of components in the memory 218 further comprise a location inferrer component 222 that can infer a geographic location of the initial unknown location of the mobile computing device 200 in the indoor environment 100 based at least in part upon the first data and the second data received by the receiver component 220. That is, as described above, the location inferrer component 222, as the mobile computing device 102 travels along the travel path 108 in the indoor environment 100, can infer the entirety of the travel path 108 over time, and thus can infer the initial location of the mobile computing device 102 in the indoor environment 100.

The memory 218 may further comprise known physical constraints 224 of the indoor environment 100. For instance, such known physical constraints 224 may be expressed in the form of a floor map of the indoor environment 100. The location inferrer component 222 can infer the location of the mobile computing device 102 along the entirety of the travel path 108 based upon a comparison between an inferred travel path of the mobile computing device 102 and the known physical constraints 224 of the indoor environment 100. Additional detail pertaining to the operation of the location inferrer component 222 is set forth below.

The plurality of components in the memory 218 can also comprise an assignor component 226 that receives RSS measurements corresponding to beacon signals observed at the mobile computing device 102 by way of the wireless radio 202 during transit of the mobile computing device 102 along the travel path 108 in the indoor environment 100. The assignor component 226 can map an RSS measurement for at least one signal received from an identified access point to a location inferred by the location inferrer component 222 along the travel path 108. The assignor component 226 can undertake such mapping of RSS measurements to locations along the travel path 108 based upon timestamps assigned to the RSS measurements and timestamps assigned to data output by the plurality of inertial sensors.

The memory 218 may further comprise a location-based application 228 that performs a function based upon location of the mobile computing device 102. For example, the location-based application 228 can be configured to output an alert to a user of the mobile computing device 102 by way of the display 208 and/or the speaker 210 when the mobile computing device 102 is at or proximate to a particular location in the indoor environment 100. Such an alert may be, for example, an advertisement for a particular product being sold at a store that is proximate to the location of the mobile computing device 102 in the indoor environment 100. In another example, the location-based application 228 may be social in nature, such that an alert is presented to the user of the mobile computing device 102 when such user is proximate to a known contact thereof. The mobile computing device 200 further includes a battery 230 that is configured to provide energy for the modules of the mobile computing device 102.

Figure 3:
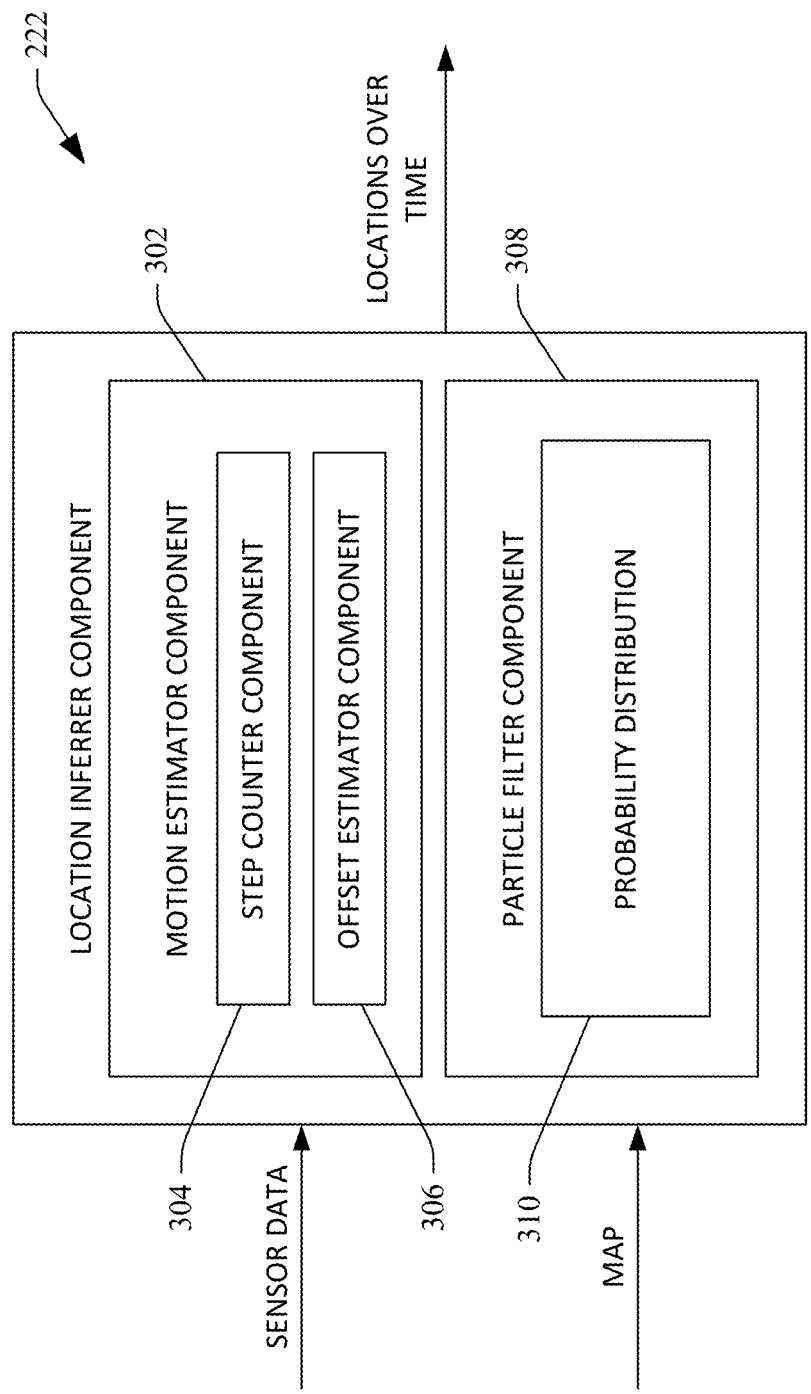
FIG. 3 is a functional block diagram of an exemplary component that facilitates inferring location of a mobile computing device based at least in part upon data output by inertial sensors in the mobile computing device and known physical constraints of an indoor environment.

With reference now to FIG. 3, a functional block diagram of the location inferrer component 222 is illustrated. The location inferrer component 222 comprises a motion estimator component 302 that is configured to determine whether or not a user of the mobile computing device 102 is walking and is additionally configured to generate an event each time a user of the mobile computing device 102 is detected as taking a step (when the user of the mobile computing device 102 is detected to be walking). The motion estimator component 302 is further configured to generate an initial, coarse estimate of a heading offset of the mobile computing device 102, wherein the heading offset is an angle between the orientation of the mobile computing device 102 and direction of motion of the user of the mobile computing device 102.

The motion estimator component 302 comprises a step counter component 304 that is configured to detect whether or not a user of the mobile computing device is walking as well as to output an event when a step is detected. In an exemplary embodiment, the step counter component 304 can be configured to perform such tasks irrespective of placement of the mobile computing device 102 relative to the user thereof. In other words, the step counter component 304 can be configured to perform the aforementioned tasks regardless of whether a user of the mobile computing device 102 carries the mobile computing device 102 in a shirt pocket, pant pocket, pouch, handbag, hand, etc.

The step counter component 304 can receive data from, for example, an accelerometer of the mobile computing device 102. When a user of the mobile computing device 102 is idle, it can be expected that the accelerometer will output relatively small values. Thus, the step counter component 304 can analyze a standard deviation in the magnitude of acceleration in connection with identifying whether a user of the mobile computing device 102 is walking. Using the standard deviation by itself, however, may not be sufficient to ascertain that the user is walking; for instance, sudden motions made by users while they are idle, such as making hand gestures, turning or shifting in a chair, etc. can also result in the accelerometer outputting relatively large acceleration values. The step counter component 304 distinguishes between walking and these types of sudden motions by exploiting a fundamental property of walking; namely, the repetitive nature thereof. Through experimental observation, it has been ascertained that two consecutive acceleration patterns across a same user and placement are typically identical when a user is walking. This observation can be employed by the step counter component 304 both for identifying that the user of the mobile computing device 102 is walking and for counting steps of the user.

The step counter component 304 can thus search for relatively repetitive patterns in data received from the accelerometer to identify that a user of the mobile computing device 102 is walking, and additionally to count a number of steps taken by the user of the mobile computing device 102. Specifically, the step counter component 304 can receive an acceleration signal a(n) from the accelerometer, and can compute a normalized auto-correlation for lag ($\tau$) at the $m^{th}$ sample as follows:

$$x(m, \tau) = \frac{\sum_{k=0}^{k=\tau-1} \left[ \begin{array}{c} (a(m+k) - \mu(m, \tau)) \\ (a(m+k+\tau) - \mu(m+\tau, \tau)) \end{array} \right]}{\sigma(m, \tau)\sigma(m+\tau, \tau)}, \quad (1)$$

where $\mu(k, \tau)$ and $\sigma(k, \tau)$ are the mean and standard deviation of the sequence of samples $<a(k), a(k+1), \ldots a(k+\tau-1)>$.

When a user of the mobile computing device 102 is walking and $\tau$ is equal to the period of the acceleration pattern, the normalized auto-correlation will be close to one. Since the value of $\tau$ is not known a priori, the step counter component 304 can estimate values of $\tau$ between $\tau_{min}$ and $\tau_{max}$ to find a value of $\tau$ for which $x(m, \tau)$ becomes maximum. Thus, $$\psi(m) = \max_{\tau = \tau_{min}}^{\tau = \tau_{max}} (x(m, \tau)). \quad (2)$$

$\psi(m)$, the maximum normalized auto-correlation, simultaneously provides two pieces of information: 1) a high value (close to one) suggests that the user is walking and the corresponding value of $\tau = \tau_{opt}$ gives the periodicity of the walk of the user. In an exemplary embodiment, the sampling frequency of the accelerometer can be approximately 50 Hz. Accordingly, a two-step duration of most users lies between 40 to 80 samples per second. Therefore a search window for the step counter component 304 ($\tau_{min}$, $\tau_{max}$) can be initially set to values corresponding to the sampling frequency of the accelerometer (e.g. between 40 and 80). Once the periodicity of a walk of the user is found to be $\tau_{opt}$, a search window can be reduced to a few samples around $\tau_{opt}$. The step counter component 304 can continuously update the value of $\tau_{opt}$ to account for small changes in walking pace of the user of the mobile computing device 102.

To determine a state of the user (e.g., idle vs. walking), the step counter component 304 can employ a combination of standard deviation in the magnitude of acceleration $\sigma_{\|a\|}$ and maximum normalized auto-correlation $\psi$. As noted above, a user can be in one of two states: idle and walking. The step counter component 304 can employ the following scheme to identify the state of the user of the mobile computing device 102:

If $\sigma_{\|a\|} < 0.01$, then state=IDLE
Else if $\psi > 0.7$, then state=WALKING
Else no change in current value of state If the user of the mobile computing device 102 is found to be in a walking state, the step counter component 304 can estimate that a step has occurred every $$\frac{\tau_{opt}}{2}$$

while the user of the mobile computing device 102 is in the WALKING state.

The motion estimator component 302 also comprises an offset estimator component 306 that estimates a heading offset of the mobile computing device 102. For example, the offset estimator component 306 can receive a signal from a compass of the mobile computing device 102. Such signal provides orientation of the mobile computing device 102 with respect to some set direction, such as North. The user of the mobile computing device 102, however, may not be holding the mobile computing device 102 along the direction of travel of the user. That is, often the user of the mobile computing device 102 will carry the mobile computing device 102 in a manner such that it is oriented at an angle $\alpha$ relative to the direction of travel of the user. Accordingly, a direction of the motion of the user of the mobile computing device 102 is $\theta + \alpha$ degrees from North, where $\theta$ is a direction of travel of the user relative to North. A typical scenario where the heading offset may be 90° is when the user of the mobile computing device 102 walks while watching a video or viewing a photo with the mobile computing device 200 oriented horizontally. For a given placement, the heading offset remains relatively constant at all times irrespective of the person changing her direction of travel.

To estimate the heading offset of the mobile computing device 102, the offset estimator component 306 can first estimate possible ranges (sectors) of heading offset values based on acceleration values generated by the accelerometer of the mobile computing device 102. Through experimentation and analysis of magnitudes of Fourier transforms of acceleration signals observed at mobile computing devices along directions parallel and perpendicular to motions of respective users, an observation was made that the second harmonic of the Fourier transform (two times the fundamental frequency) was either completely absent or extremely weak in the accelerations experienced by a mobile computing device when oriented perpendicularly to the direction of travel of a user thereof. The second harmonic, however, was found to be present and dominant when the orientation of the mobile computing device was parallel to the direction of travel of the user thereof.

Accordingly, it can be assumed that the magnitude of the second harmonic in the Fourier transform along the direction North is $F_y$ and that along the direction West is $F_x$. Since almost the entire contribution of this harmonic is from the direction of travel of the user, $F_x$ and $F_y$ must be its components. Thus $$\theta + \alpha = \arctan\left(\frac{F_x}{F_y}\right).$$

Since, however, the magnitude of the Fourier transform is employed, there is no way of knowing whether a user is walking forwards or backwards along this angle. Consequently, it is equally likely that $$\alpha + \theta = \tan^{-1}\frac{F_x}{F_y} + 180.$$

Since the offset estimator component 306 can receive $\theta$ from a compass of the mobile computing device 102, the offset estimator component 306 can estimate two possible values of $\alpha$.

The location inferrer component 222 further comprises a particle filter component 308 that receives heading offset estimates from the offset estimator component 306 and signals from the step counter component 304 that are indicative of when a user of the mobile computing device 102 takes a step. As described above, the location inferrer component 222 has access to known physical constraints of the indoor environment 100. Through utilization of the particle filter component 308, the inferrer component 222 eliminates infeasible locations from potential locations. In other words, as a user of the mobile computing device 102 walks more and more within the indoor environment 100 while navigating turns and corners, a number of possible paths in the indoor environment 100 decreases. The longer the walk, the smaller the number of such possibilities. As a user of the mobile computing device 102 travels in the indoor environment 100, the inferrer component 222 continuously eliminates possibilities that violate physical constraints until eventually one possibility remains. In connection with performing this task, the particle filter component 308 maintains a probability distribution 310 of possible locations of the user of the mobile computing device 102 and updates such probability distribution at every step taken by the user (as observed by the step counter component 304).

Pursuant to an example, the particle filter component 308 can employ stride length of a user to convert each step observed by the step counter component 304 to a distance. As any two different people have different heights and different stride lengths, the particle filter component 308 can estimate stride length of a user while simultaneously inferring location of the user. The particle filter component 308 additionally more accurately estimates the heading offset initially estimated coarsely by the offset estimator component 306. Accordingly, the particle filter component 308 is an augmented version of a standard particle filter, which conventionally includes only the location of the mobile computing device 102. Specifically, the particle filter additionally takes into consideration stride length of the user of the mobile computing device 102 and heading offset as two additional unknowns. Therefore, the location inferrer component 222 continuously maintains and updates a four dimensional joint probability distribution for location (X,Y), stride length, and heading offset.

Stride length estimation is now described. The particle filter component 308 maintains the four dimensional joint probability distribution 310 as a particle filter—a set of four dimensional particles (samples) $X=(X_1, X_2, \ldots, X_N)$ representative of the probability distribution. Here, $X_i=(x_i, y_i, s_i, \alpha_i)$, with $s_i$ being a stride length of the user of the mobile computing device 102. After the user takes a $k^{th}$ step, each $i^{th}$ particle is updated as follows:

$$x_i^k = x_i^{k-1} + (s_i+\delta_i)\cos(\alpha_i+\theta+\beta_i) \quad (3)$$

$$y_i^k = y_i^{k-1} + (s_i+\delta_i)\sin(\alpha_i+\theta+\beta_i). \quad (4)$$

In Eqs. (3) and (4), $\theta$ is the compass reading. To account for compass measurement errors, $\theta$ can be perturbed by adding a Gaussian random variable $\beta_i$ with a set standard deviation, such as approximately two degrees. Further, to account for temporary stride variations, $s_i$ can be perturbed by a uniformly distributed random variable $\delta_i$ in the range of, for example, $(-0.05s_i, 0.05s_i)$.

After each update, the location inferrer component 222 tests particles to see if they violate any known physical constraints (walls) by passing through such walls. If, for example, a line joining $(x_i^k, y_i^k)$ and $(x_i^{k-1}, y_i^{k-1})$ intersects a wall, then such particle is eliminated. In order to replace an eliminated particle, a particle from the particle set at the $k^{th}$ step is randomly chosen and updated. It can be noted that $s_i$ and $\alpha_i$ are not updated, rather they are eliminated.

In experiments, it has been found that within one step it is possible to obtain several readings from a compass of the mobile computing device 102. Therefore, an average value of compass readings can be employed to arrive at $\theta$. Sometimes when the user turns, $\theta$ values may change by a large amount within one step. Thus, if a compass value changes by more than some threshold amount (e.g., 20°) within a single step, the location inferrer component 222 can perform incremental updates by using fractional step sizes in proportion to the step duration.

Once the location inferrer component 222 relatively accurately determines the location of the mobile computing device 102, past data can be employed to accurately locate the travel path of the user. For example, each particle $X_i^k$ after the $k^{th}$ step maintains a link to its parent particle; e.g., the particle $X_j^{k-1}$ from which it is generated. In the backward belief propagation step, from the set of particles $X^{k-1}=X_1^{k-1}, X_2^{k-1}, \ldots, X_N^{k-1}$, particles with no children in the set of particles $X^*k$ can be eliminated. This ensures that possibilities that were eliminated in future steps do not exist in past steps.

Figure 4:
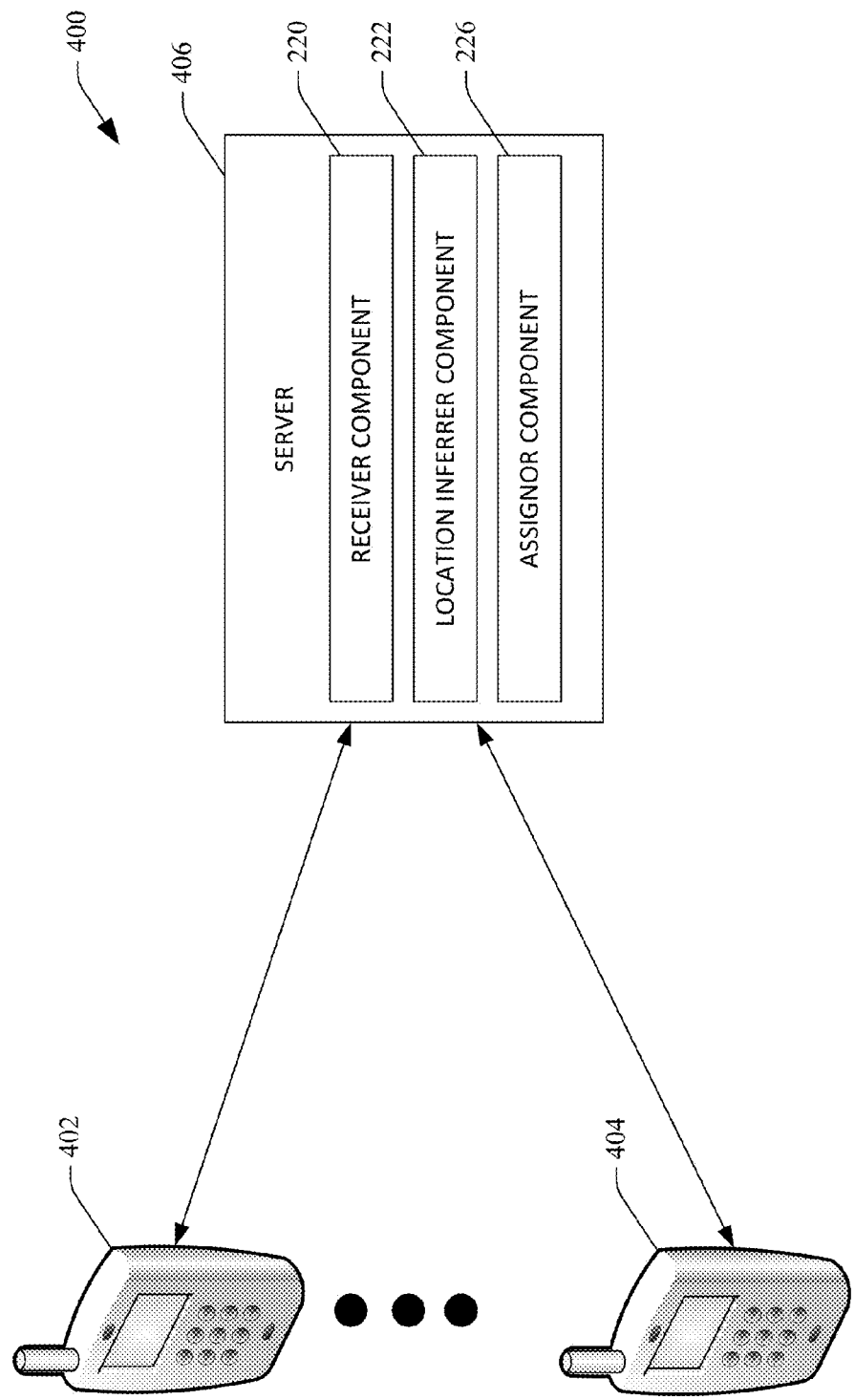
FIG. 4 is a functional block diagram of an exemplary system that facilitates crowdsourcing a set of training data for generating a radio frequency (RF) map of an indoor environment.

With reference now to FIG. 4, an exemplary system 400 that facilitates crowdsourcing data that can be employed to generate a RF map of the indoor environment 100 is illustrated. The system 400 comprises a plurality of mobile computing devices 402-404 configured to output data from inertial sensors therein. A server 406 is in communication with the mobile computing devices 402-404, wherein the server 406 comprises the receiver component 220, the location inferrer component 222, and the assignor component 226. While the components 222, 224, and 226 are shown as residing on the server 406, it is to be understood that the mobile computing devices 402-404 can be configured with such components and can transmit locations with RSS measurements mapped thereto to the server 406. As referred to above, the mobile computing devices 402-404 can be configured to periodically scan for beacons from proximate access points (including cellular towers) and record corresponding RSS measurements with respective timestamps. Furthermore, as travel paths taken by users of the mobile computing devices 402-404 are inferred, locations along the path can be annotated with timestamps, indicating a time at which a mobile computing device was located at a particular point in the path. Thus, a location in the indoor environment 100 where a certain RSS measurement was taken can be ascertained, and data in the form of <location,RSS values> can be generated for retention at the server 406. Such database of measurements can be employed to locate new users using existing Wi-Fi localization techniques. Exemplary localization schemes that can be employed are now described.

First, a set of location-annotated RSS measurements can be employed to construct a probability distribution $P(rss_{AP_k}=r|x=x_i)$—the probability of measuring an RSS value of $r$ from access point $AP_k$ at location $x_i$. $x$ here is a two-dimensional location. In order to locate a mobile computing device using such technique, a device measures a vector of RSS measurements, $R=<r_1, r_2, \ldots, r_m>$, where $r_i$ is the RSS measurement from $AP_i$. The probability of observing $R$ at a location $x_i$ is then computed as follows:

$$P(R|x=x_i)=\Pi_k P(rss_{AP_k}=r_k|x=x_i). \quad (5)$$

Using Bayesian inference, $P(R|x=x_i)$ can be computed. The location of the device can then be estimated using either maximum likelihood location (location with the highest probability) or computed as an expectation over all locations (expected location).

Another exemplary technique for performing Wi-Fi localization is now described. Such technique can rely on an RF propagation model for Wi-Fi RSS measurements in indoor environments—the Log Distance Path Loss (LDPL) model. The LDPL model estimates RSS $rss_x^k$ (in dBm) at a location $x$ of a beacon from $AP_k$ at a location $c_k$ as follows:

$$rss_x^k = rss_0^k - 10\gamma_k \log(d(x, c_k)) + N(x). \quad (6)$$

In Eq. (6), $rss_0^k$ is the RSS from $AP_k$ at a distance of 1 meter, $\gamma_k$ is the path loss exponent, and $d(x, c_k)$ is a distance between locations $x$ and $c_k$. $N(x)$ captures the random fluctuations in RSS due to multipath effects. Wi-Fi measurements (some annotated with locations and others not) can be used from within the indoor environment 100 to construct the LDPL model for each Wi-Fi access point within the indoor environment 100. In order to locate a device, an RSS measurement obtained from an access point can be converted to a distance from the access point using the LDPL model as follows.

$$d(x, c_k) = 10^{\left(\frac{rss_0^k - r_k}{10\gamma}\right)} \quad (7)$$

Standard triangulation-based techniques may then be used to locate the device once its distance from three or more access points is determined.

While the description above made reference to computing location of the mobile computing device without knowledge of an initial location thereof, it is to be understood that the location of the mobile computing device can be more quickly inferred if an estimate of the initial location is known. Accordingly, in some embodiments, techniques such as triangulation or the like can be used to obtain an initial estimate of location of the mobile computing device 102 in the indoor environment 100 to more quickly determine a location of the mobile computing device 102 in the indoor environment 100 accurately.

Moreover, while the description set forth above has been in connection with generating an RF map of an indoor environment, it is to be understood that aspects described herein can be employed to crowdsource location-based data relative to parameters other than RSS values. For example, the mobile computing device 102 can comprise a temperature sensor, and can assign temperature values to inferred locations in the indoor environment 100. Accordingly, a temperature distribution in an indoor environment can be learned, and can subsequently be employed to infer a location of a user, particularly if the temperature distribution is relatively constant, at least with respect to time (e.g., at 5:00 pm, the temperature at location X tends to be 21 degrees Celsius). A humidity distribution can also be learned in a similar manner. Thus, it is to be understood that the features described herein are not limited to learning an RF map of the indoor environment 100.

In yet another exemplary embodiment, aspects described herein can be employed to crowdsource location-based video data in support of, for instance, augmented reality-based mapping of spaces. For example, the camera 204 of the mobile computing device 200 can be configured to capture still images or video in the indoor environment 100, and such still images or video can be tagged with location data inferred by the location inferrer component 222.

Figure 5:
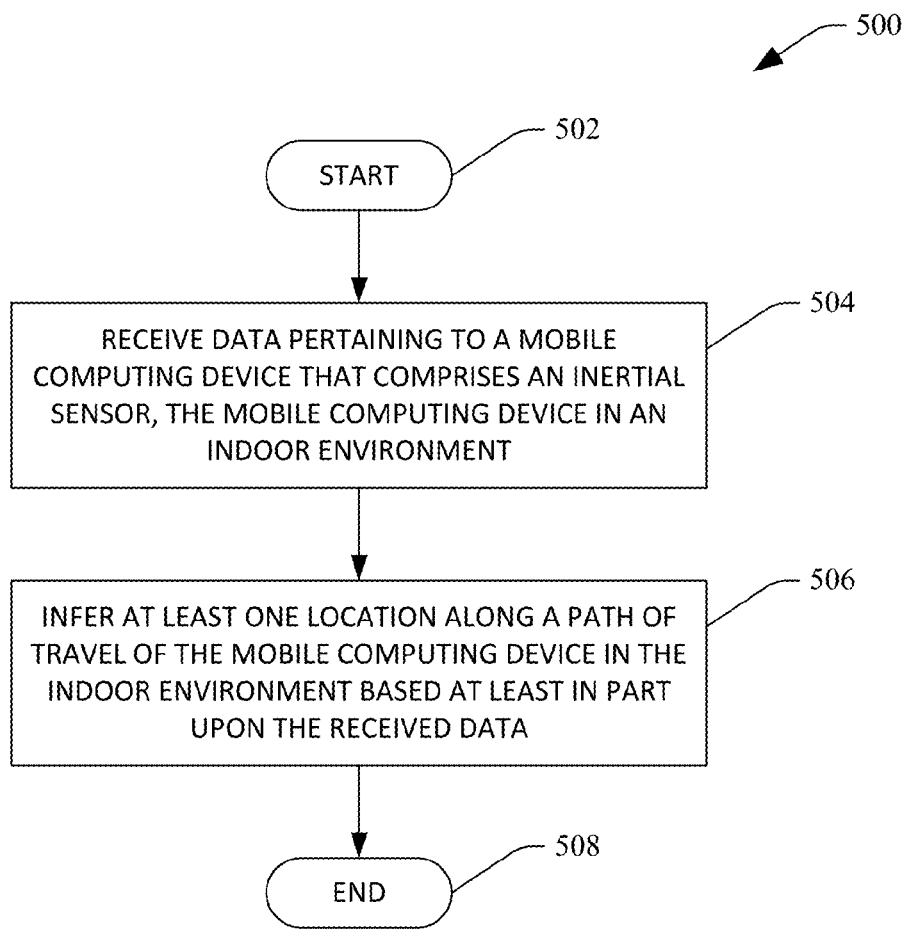
FIG. 5 is a flow diagram that illustrates an exemplary methodology for inferring at least one location of a mobile computing device in an indoor environment.
Figure 6:
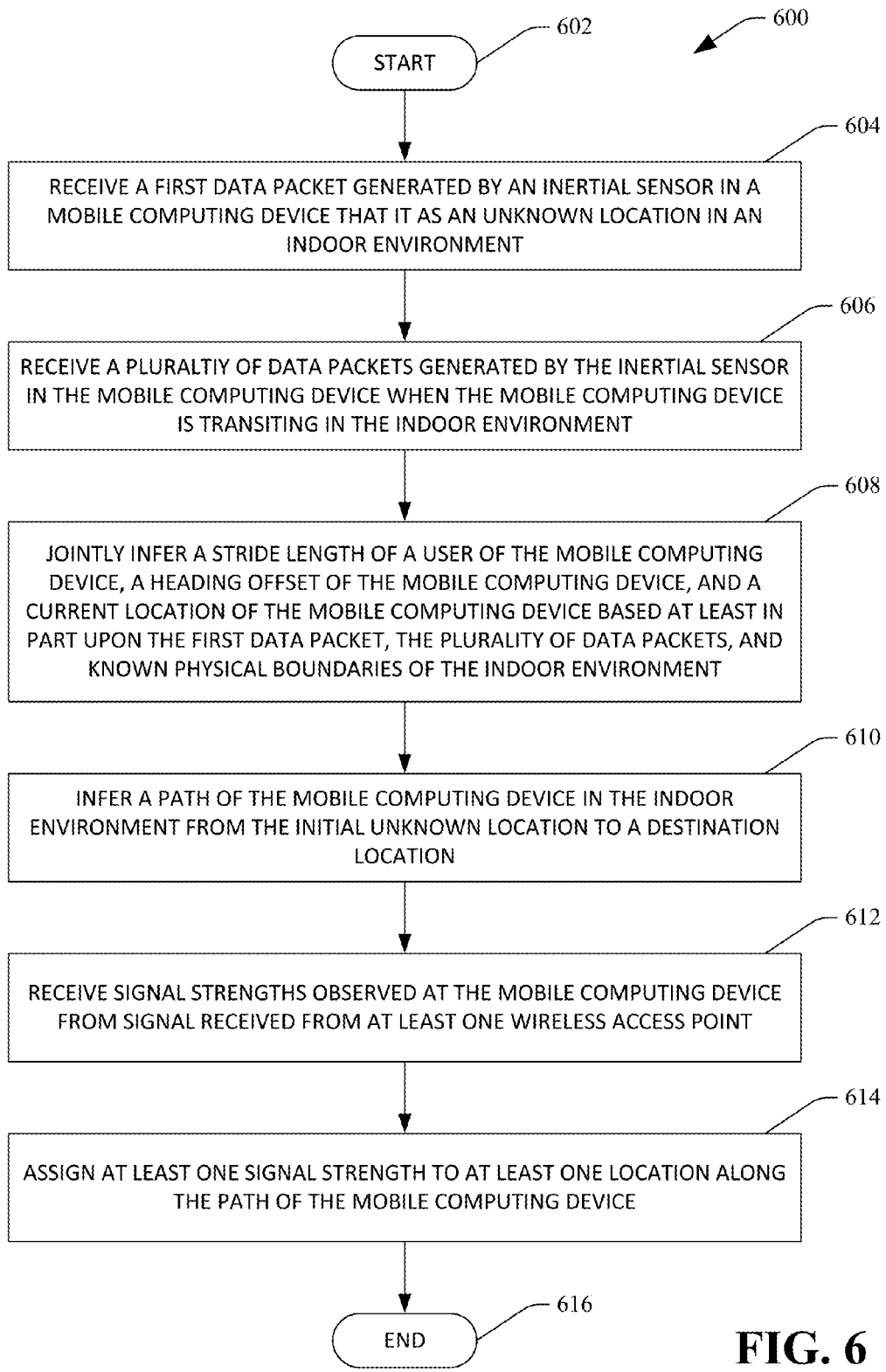
FIG. 6 is a flow diagram that illustrates an exemplary methodology for crowdsourcing data for employment in connection with generating a RF map of an indoor environment.

With reference now to FIGS. 5 and 6, exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

With reference now solely to FIG. 5, an exemplary methodology 500 that facilitates inferring at least one location along a travel path of a mobile computing device in an indoor environment is illustrated. The methodology 500 starts at 502, and at 504 data pertaining to a mobile computing device that comprises an inertial sensor is received. As mentioned above, the mobile computing device is in an indoor environment where, for example GPS sensors are unreliable or inoperable. The data received at 504 can include an initial data packet generated by the inertial sensor in the mobile computing device, wherein the initial data packet is generated when the mobile computing device is at an initial location in the indoor environment. Such initial location of the mobile computing device can be arbitrary and unknown. The data received at 504 can further comprise a plurality of data packets generated by the inertial sensor subsequent in time to the inertial sensor generating the initial data packet. The plurality of data packets can be generated by the inertial sensor over a range of time as the mobile computing device transits along a path in the indoor environment, wherein the path begins at the initial location.

At 506, at least one location along the path of the mobile computing device in the indoor environment is inferred based at least in part upon the initial data packet and the plurality of data packets received at 504. Furthermore, the path of the mobile computing device in the indoor environment can be inferred by way of back propagation, such that the initial location is inferred based at least in part upon the inferring of the at least one location along the path of travel. Moreover, the inferring of the at least one location along the path of travel can comprise inferring a stride length of the user of the mobile computing device based at least in part upon the initial data packet and the plurality of data packets received at 504. Still further, the inferring undertaken at 506 can comprise computing a shape of the path of the mobile computing device in the indoor environment based upon the data received at 504, as well as comparing the shape of the path of the mobile computing device in the indoor environment with path boundaries specified in a map of the indoor environment. In such case, the at least one location of the mobile computing device in the indoor environment is inferred based at least in part upon the comparing of the shape of the path of the mobile computing device in the indoor environment with the path boundaries specified in the map of the indoor environment. The methodology 500 completes at 508.

Now referring to FIG. 6, an exemplary methodology 600 that facilitates crowdsourcing data for employment in generating an RF map of an indoor environment is illustrated. The methodology 600 starts at 602, and at 604, a first data packet generated by an inertial sensor in a mobile computing device is received, wherein the mobile computing device is at an initial unknown location, and wherein the initial unknown location is indeterminable based solely upon the first data packet.

At 606, a plurality of data packets generated by the inertial sensor when the mobile computing device is transiting in the indoor environment are received. At 608, a stride length of the user of the mobile computing device, a heading offset the mobile computing device, and a current location of the mobile computing device are jointly inferred based at least in part upon the first data packet, the plurality of data packets, and known physical constraints of the indoor environment.

At 610, a path of the mobile computing device in the indoor environment is inferred from the initial unknown location to a destination location based at least in part upon the jointly inferring of the stride length, the heading offset, and the current location.

At 612, signal strengths observed at the mobile computing device from signals received from at least one wireless access point are received. The signal strengths correspond to times when the mobile computing device was transiting in the indoor environment. At 614, at least one signal strength value is assigned to at least one location along the path of the mobile computing device based at least in part upon the inferring of the path of the mobile computing device in the indoor environment. The methodology 600 completes at 616.

Figure 7:
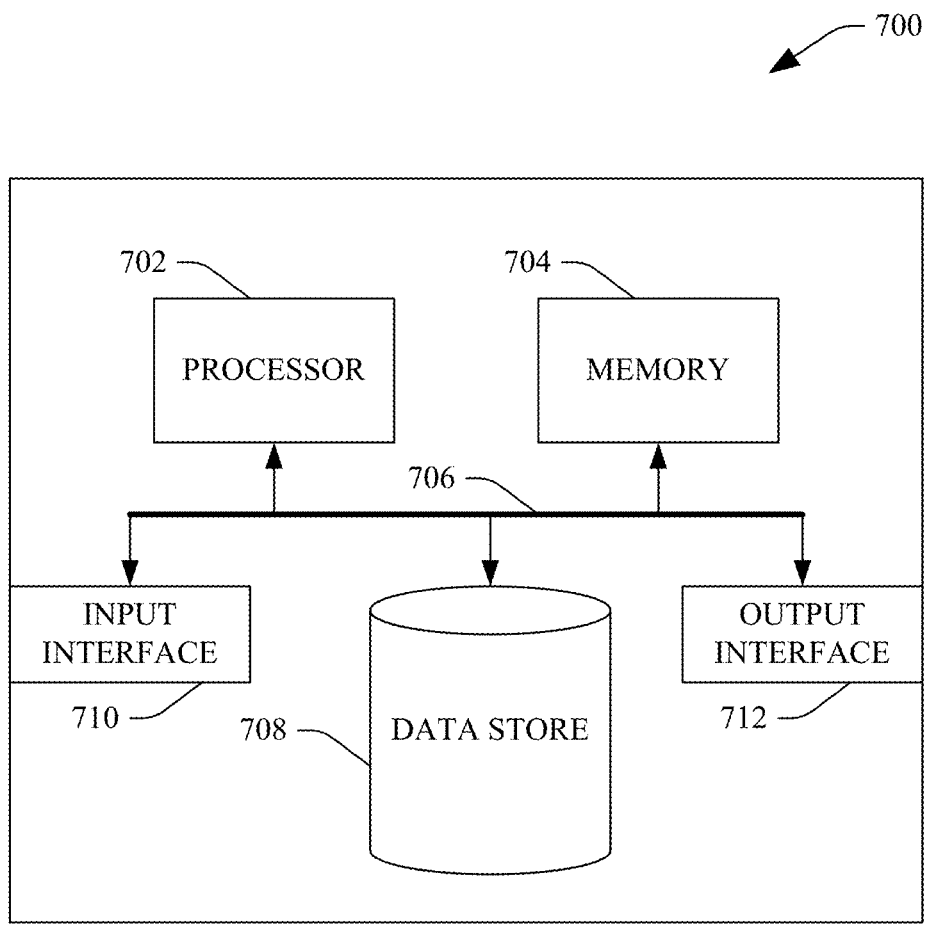
FIG. 7 is an exemplary computing device.

Now referring to FIG. 7, a high-level illustration of an exemplary computing device 700 that can be used in accordance with the systems and methodologies disclosed herein is illustrated. For instance, the computing device 700 may be used in a system that supports inferring location of a wireless computing device in an indoor environment. In another example, at least a portion of the computing device 700 may be used in a system that supports crowdsourcing data for use in a training set that can be employed in connection with RF fingerprinting. The computing device 700 includes at least one processor 702 that executes instructions that are stored in a memory 704. The memory 704 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store training data, RSS measurements, data generated by inertial sensors, etc.

The computing device 700 additionally includes a data store 708 that is accessible by the processor 702 by way of the system bus 706. The data store 708 may be or include any suitable computer-readable storage, including a hard disk, memory, etc. The data store 708 may include executable instructions, training data, weights for synapses between layers in a DTNN, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
   receiving data pertaining to a mobile computing device that comprises an inertial sensor, the data comprising:
      an initial reading from the inertial sensor in the mobile computing device, the initial reading obtained when the mobile computing device is at an initial location in an indoor environment, wherein the initial location is unknown; and
      a plurality of readings from the inertial sensor, the plurality of readings obtained subsequent in time from when the initial reading was obtained, the plurality of readings from the inertial sensor obtained over a range of time as the mobile computing device transits along a path in the indoor environment beginning at the initial location; and
   inferring at least one location along the path of the mobile computing device in the indoor environment based at least in part upon the initial reading and the plurality of readings, wherein inferring of the at least one location of the mobile computing device in the indoor environment comprises inferring a length of a stride of a user of the mobile computing device based upon the initial reading and the plurality of readings.

2. The method of claim 1, wherein an orientation of the mobile computing device relative to a direction of motion of the mobile computing device when transiting along the path is arbitrary, and wherein inferring the at least one location along the path of the mobile computing device further comprises inferring a heading offset of the mobile computing device, the heading offset being a difference in the orientation of the mobile computing device relative to the direction of motion of the mobile computing device.

3. The method of claim 1, wherein a position of the mobile computing device relative to a body of a user of the mobile computing device is arbitrary.

4. The method of claim 1, wherein the at least one location that is inferred is the initial location of the wireless computing device.

5. The method of claim 1, wherein the at least one location is a current location of the wireless computing device in the indoor environment.

6. The method of claim 1, further comprising inferring the path of the mobile computing device in the indoor environment by way of backpropagation, wherein the initial location is inferred based at least in part upon the inferring of the at least one location.

7. The method of claim 1, wherein the inferring of the at least one location of the mobile computing device in the indoor environment further comprises:
   computing a shape of the path of the mobile computing device in the indoor environment;
   comparing the shape of the path of the mobile computing device in the indoor environment with path boundaries specified in a map of the indoor environment; and
   inferring the at least one location of the mobile computing device in the indoor environment based at least in part upon the comparing of the shape of the path of the mobile computing device in the indoor environment with the path boundaries specified in the map of the indoor environment.

8. The method of claim 1, wherein the readings are obtained over the range of time, and wherein the inferring is undertaken as the data is received.

9. The method of claim 1, wherein the inertial sensor is one of an accelerometer, a compass, or a gyroscope.

10. The method of claim 1, further comprising receiving signal strength values of respective wireless signals received at the mobile computing device over the range of time, the respective wireless signals received at the mobile computing device from wireless signal transmitters that are external to the mobile computing device, and wherein the method further comprises assigning at least one signal strength value to the at least one location based at least in part upon the inferring of the at least one location of the mobile computing device in the indoor environment.

11. The method of claim 1 being executed by the mobile computing device.

12. The method of claim 1, wherein the inferring of the at least one location of the mobile computing device in the indoor environment further comprises computing probability distributions of respective locations of the mobile computing device in the indoor environment as the mobile computing device transits along the path.

13. The method of claim 12, wherein the computing of the probability distributions of the respective locations of the mobile computing device in the indoor environment as the mobile computing device transits along the path comprises utilizing multi-dimensional particle filtering comprising a plurality of dimensions, wherein the plurality of dimensions comprises dimensions corresponding to physical location, a dimension corresponding to a stride length of a user of the mobile computing device, and a dimension corresponding to a heading offset of the mobile computing device.

14. A system, comprising:
a processor; and
memory that comprises instructions that, when executed by the processor, cause the processor to perform acts comprising:
receiving data generated by at least one inertial sensor in a mobile computing device, the mobile computing device residing in an indoor environment, and wherein the data comprises:
first data generated by the at least one inertial sensor when the mobile computing device is at an initial unknown location in the indoor environment, the initial unknown location being an arbitrary location in the indoor environment, and wherein the initial unknown location is indeterminable based solely upon the first data; and
second data generated by the at least one inertial sensor subsequent to the mobile computing device being at the initial unknown location in the indoor environment, the second data generated by the at least one inertial sensor during transit of the mobile computing device from the initial unknown location along a path;
estimating a length of a stride of a user of the mobile computing device based upon the second data generated by the at least one inertial sensor; and
inferring a geographic location of the initial unknown location of the mobile computing device in the indoor environment based at least in part upon the first data and the estimated length of the stride of the user.

15. The system of claim 14, the acts further comprising:
receiving a signal strength value for a signal transmitted by a wireless access point and received at the mobile computing device at a time corresponding to the first data; and
assigning the signal strength value to the geographic location subsequent to the geographic location of the initial unknown geographic location being inferred.

16. The system of claim 14, wherein inferring a geographic location of the initial unknown location of the mobile computing device in the indoor environment comprises inferring the geographic location of the initial unknown location of the mobile computing device based upon a comparison between the path of the mobile computing device and known physical constraints of the indoor environment.

17. The system of claim 14, the acts further comprising:
inferring a current geographic location of the mobile computing device in the indoor environment based at least in part upon the first data and the second data; and
causing a location-based alert to be presented to a user of the mobile computing device based at least in part upon the inferred current geographic location of the mobile computing device.

18. A computer-readable data storage device comprising instructions that, when executed by a processor, cause the processor to perform acts comprising:
receiving a first reading from an inertial sensor in a mobile computing device when the mobile computing device is at an initial unknown location in an indoor environment, the initial unknown location being an arbitrary location in the indoor environment, and wherein the initial, unknown location is indeterminable based solely upon the first reading;
receiving a plurality of readings from the inertial sensor in the mobile computing device when the mobile computing device is transiting in the indoor environment, the plurality of readings obtained from inertial sensor subsequent to the first reading being obtained from the inertial sensor;
jointly inferring a length of a stride of a user of the mobile computing device, a heading offset of the mobile computing device, and a current location of the mobile computing device based at least in part upon the first reading, the plurality of readings, and known physical constraints of the indoor environment, wherein the heading offset is an orientation of the mobile computing device relative to a direction of travel of the mobile computing device;
inferring a path of the mobile computing device in the indoor environment from the initial unknown location to a destination location based at least in part upon the jointly inferring of the stride length, the heading offset, and the current location;
receiving signal strengths observed at the mobile computing device from signals received from at least one wireless access point, the signal strengths corresponding in time to when the mobile computing device is transiting in the indoor environment; and
assigning at least one signal strength to at least one location along the path of the mobile computing device based at least in part upon the inferring of the path of the mobile computing device in the indoor environment.

19. The system of claim 14, the at least one inertial sensor is one of an accelerometer, a compass, or a gyroscope.

20. The system of claim 14, wherein inferring the geographic location of the initial unknown location of the mobile computing device comprises:
eliminating infeasible travel paths in the indoor environment based upon known physical constraints of the indoor environment; and
inferring the geographic location of the initial unknown location of the mobile computing device based upon the infeasible travel paths being eliminated.

* * * * *